United States Patent [19]

Kennedy

[11] Patent Number: 5,507,245
[45] Date of Patent: Apr. 16, 1996

[54] CLEARANCE INDICATING DEVICE

[76] Inventor: Samuel Kennedy, 540 Timothy St., Apt. 302, New Market, Ontario, Canada, L3T 5N5

[21] Appl. No.: 300,461

[22] Filed: Sep. 2, 1994

[51] Int. Cl.⁶ ........................................... B60Q 1/48
[52] U.S. Cl. .................. 116/28 R; 116/303; 446/330
[58] Field of Search .................. 116/28 R, 281, 116/282, 283, 284, 285, 303; 33/264; 40/411, 415, 419; 446/330; 482/83, 84, 90

[56] References Cited

U.S. PATENT DOCUMENTS

| | | | |
|---|---|---|---|
| 1,210,266 | 12/1916 | Bickelhaupt | 446/330 |
| 1,729,890 | 10/1929 | Meyer | 116/303 |
| 2,731,934 | 1/1956 | Hausmann et al. | 116/28 R |
| 3,261,321 | 7/1966 | Mandl | 116/28 R |
| 4,598,660 | 7/1986 | Konzak | 116/22 A |

FOREIGN PATENT DOCUMENTS 546090  3/1956  Belgium .......................... 116/28 R

*Primary Examiner*—William A. Cuchlinski, Jr.
*Assistant Examiner*—Willie Morris Worth
*Attorney, Agent, or Firm*—David W. Wong

[57] ABSTRACT

This clearance indicating device has a pivotal rod for contacting an automobile when the latter is driven close to a wall surface. The pivotal rod causes a sliding rod to slide upwards from a support frame. The closer the automobile is positioned to the wall surface the higher the sliding rod will extend upwards from the support frame. Two pivotally mounted cantilever arms are mounted on the support frame. The arms are connected to two ends of a sliding cord coupled to the sliding rod such that the arms will swing upwards in various degrees to indicate the closeness of the automobile to the vertical wall surface.

6 Claims, 2 Drawing Sheets

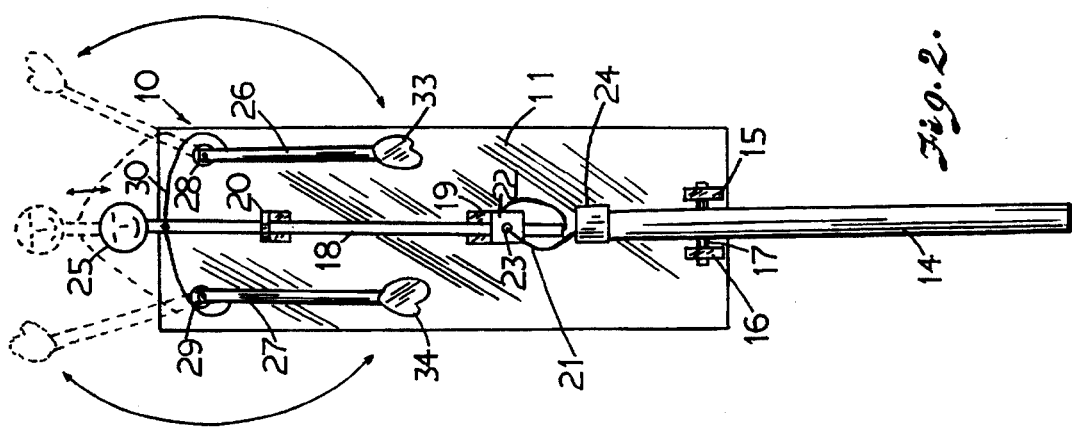
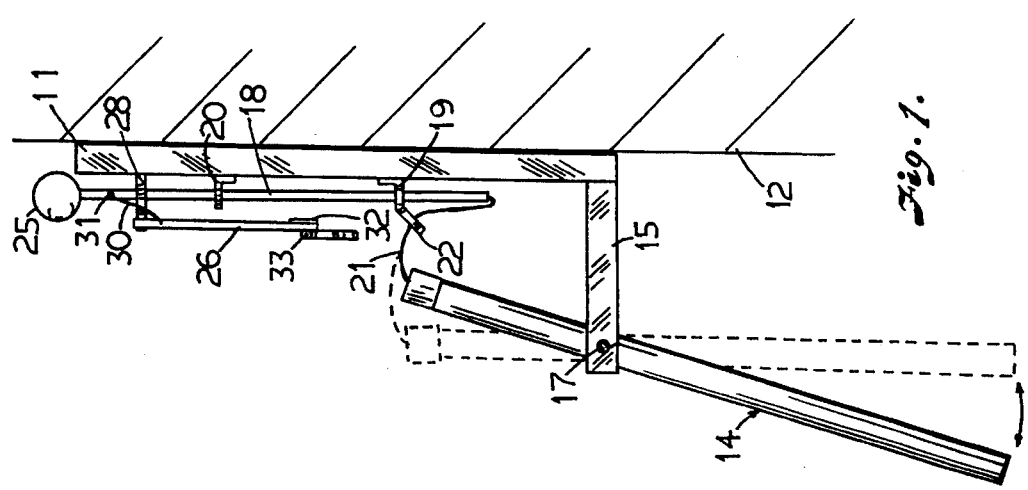

CLEARANCE INDICATING DEVICE

BACKGROUND OF THE INVENTION

This invention relates to an indicating device and particularly relates to a clearance indicating device which can be located juxtaposed to a wall surface to provide distinctive visual indications to the driver of the closeness of an automobile from the wall surface when the automobile is driven close to the latter.

When driving an automobile into a garage or in a narrow driveway having an end wall or high side walls, it is difficult for the driver to judge the closeness of the space or distance between the automobile and such wall surfaces. The misjudgment by the driver may result in damages to the automobile from coming into contact with the walls. Heretofore, warning devices have been made to assist the driver in spacing the automobile at a safe distance away from the walls of the garage. One such devices consists of a fixed length flexible rod having a resilient ball mounted at its front end. The rod is mounted in a cantilever manner on the garage side walls such that it extends in a horizontal fashion to mark the pre-selected safe distance. The mere touching of the automobile body with the ball mounted on the rod would indicate the pre-selected safe spacing of the automobile from the wall. In another device, a resilient material or device is mounted on the end wall of the garage or driveway. The resilient material or device defines the desirable distance of the automobile to be located away from the end wall and it is also for absorbing the impact force that the automobile otherwise may be exerted onto the end wall and may result in damage to both the automobile and the wall. Such devices although are simple in structure, they do not provide an effective and distinctive visual guidance to the driver. Furthermore, they do not provide indications of varying degree of closeness of the automobile from the wall surface in order that the driver may choose to place the automobile at a selected safe distance therefrom. Other common indication devices either are complex in structure and expensive to produce, or also do not provide varying warnings to indicate the varying closeness of the automobile to the wall surface.

SUMMARY OF THE INVENTION

It is a principal object of the present invention to provide a clearance indication device which provides a distinctive visual indication to the driver of the closeness of the automobile from a vertical wall surface.

It is another object of the present invention to provide a clearance indication device which provides varying indications of the closeness of the automobile from a wall surface.

It is another object of the present invention to provide an indication device which is simple in structure and yet provides an effective distance indication.

Briefly the clearance indicating device of the present invention has a support frame which may be mounted juxtaposed to a wall surface to which the automobile is to be driven towards or to be located adjacent thereto in a close distance. The device has an elongated contact rod member pivotally mounted to the support frame. The contact rod member has a lower portion normally extends outwards into the path of the automobile and is intended to contact the automobile when the latter is driven towards it or is located adjacent thereto, and to be pivoted thereby. The contact rod member has an upper end which will pivot in various distances from the support frame relative to the closeness of the automobile from the wall surface. A pull cord means has one end therein secured to the upper portion of the rod member and its other end is secured to one end of a sliding rod member. The pull cord means and the sliding rod member are slidably mounted on the support frame. A tension cord is mounted to the sliding rod member. The tension cord has one free end connected to a swing arm member which is pivotally mounted in a cantilever manner on the support frame. The swing arm member will swing outwards in various degrees from the support frame relative to closeness of the automobile from the wall surface due to that the extended elongated contact rod member is being pivoted by the automobile.

BRIEF DESCRIPTION OF THE DRAWINGS

FIG. 1 is a perspective side elevation view of the clearance indication device according to the present invention mounted on a vertical wall surface adjacent to an automobile.

FIG. 2 is a perspective front elevation view of the clearance indication device.

DETAILED DESCRIPTION OF THE PREFERRED EMBODIMENTS

Figure 3:
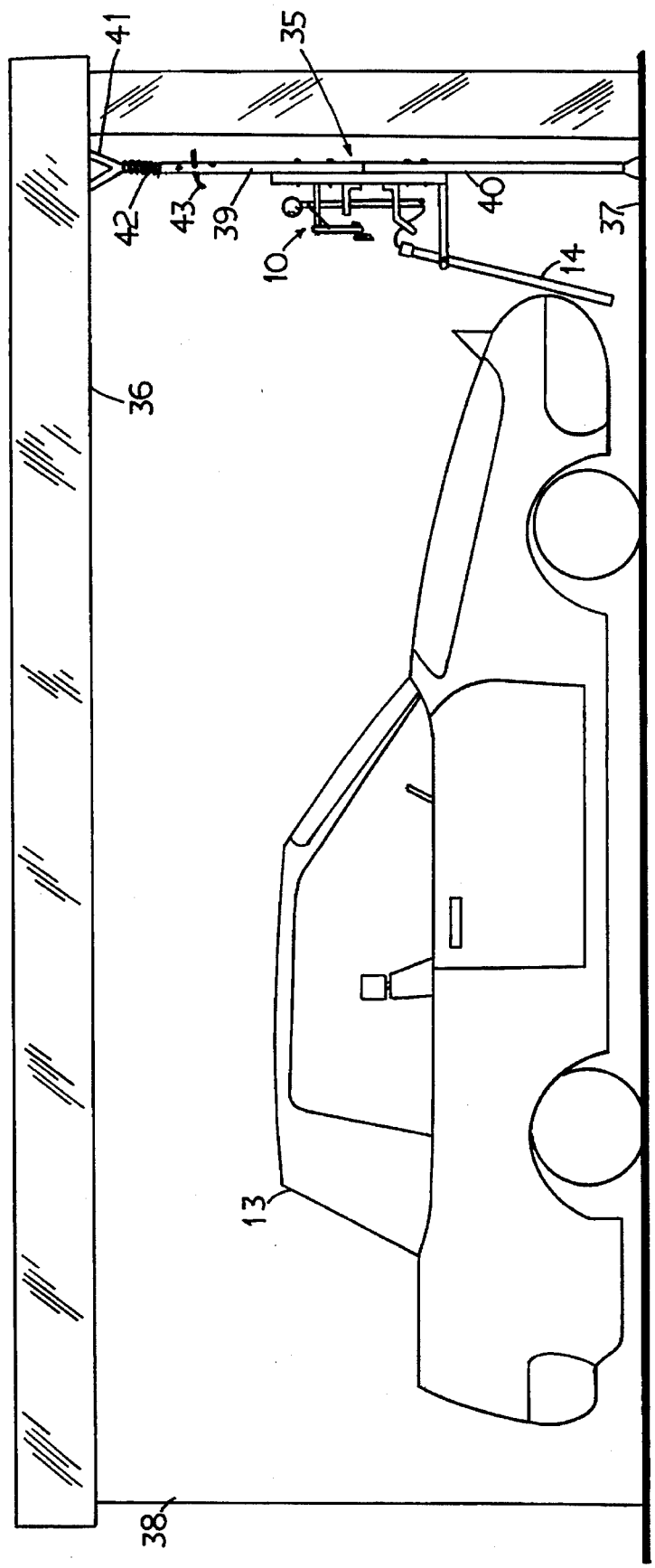
FIG. 3 is a perspective side elevation view of a garage having the clearance indication device according to the present invention mounted on a tension rod positioned adjacent to the end wall of the garage.

With reference to the drawings wherein like reference numerals designate corresponding parts in the several views, the clearance indication device 10 of the present invention has a support frame 11 which may be mounted on a wall 12 to which an automobile 13 is to be driven towards or located adjacent thereto. The device 10 is positioned at the eye level of the driver such that its signalling is clearly visible to the driver.

An elongated contact rod 14 is pivotally mounted on a U-shaped bracket having two parallel arms 15 and 16 extending generally perpendicular to the support frame 11. Alternatively, the two arms may be in the form of two separate straight sections individually mounted to the support frame 11. The contact rod 14 is pivotally mounted to the arms 15 and 16 through a pin 17. A sliding rod 18 is slidably mounted to the support frame 11 by two brackets 19 and 20. The sliding rod 18 is preferably made of a heavy material such as a metal rod. A pull cord 21 is slidably mounted to the support frame 11 by a bracket 22 which may be integral with the bracket 19. The pull cord slidably extends through an opening 23 formed in the bracket 22, and one end of the pull cord 21 is secured to the top portion 24 of the contact rod 14 and the other end therein is secured to the lower end of the sliding rod 18, so that the pivoting of the contact rod 14 will cause the sliding rod 18 to slide up and down with respect to the support frame 11. A decorative and attention drawing piece 25 such as in the form of a human head or face may be mounted to the top end of the sliding rod 18.

At least one, and preferably two swing arms 26 and 27 are mounted in a cantilever manner on the support frame 11 by two cantilever arms 28 and 29 respectively. A tension cord 30 is slidably mounted to the upper portion of the sliding rod 18 by threading through an opening 31. One end of the tension cord 30 is secured to the swing arm 26 and the other end therein is secured to the other swing arm 27. A weight 32 is mounted to one of the swing arms, so that one arm is heavier than the other. For convenience of illustration, the weight 32 is mounted to the left swing arm 26 as best shown in FIG. 1. Two attention attracting signs 33 and 34 are mounted to the lower end of the swing arms 26 and 27.

Normally in the stand-by condition, the sliding rod 18, due to its own weight, will slide downwards to its lowest position restrained only by the pull cord 21 which also maintains the lower portion of the contact rod 14 to locate at the largest angular position with respect to the support frame 11. When the lower end of the contact rod 14 comes in contact with the automobile 13 when the automobile is driven towards it, it would pivot with respect to the support frame 11. The pivoting movement of the contact rod 14 will cause the pull cord 21 to pull the sliding rod 18 to slide upwards. The decorative piece 25 will also move upwards to warn the driver that the automobile is now touching the indicating device and is at a safe distance from the wall 12. When the automobile is driven closer to the wall 12, it will cause the contact rod 14 to pivot further, and in turn the pull rod will pull the sliding rod 18 to slide further upwards. The further upward movement of the sliding rod 18 will impose a tension on the tension cord 30 thus causing the lighter right swing arm 27 to start pivoting upwards. The closer the automobile 13 moves towards the wall 12 the further upwards the right swing arm 27 will pivot, until the automobile 13 is located at its predetermined closest position in which the tension exerted on the tension cord 30 by the sliding rod 18 will also cause the heavier left swing arm 26 to swing to an upward position. Thus, the indicating device 10 provides to the automobile driver various indications relative to the various distances between the automobile and the wall surface.

The clearance indicating device 10 of the present invention may be directly mounted on the vertical wall surface, or it may be mounted on a vertical rod such as a tension rod 35 which is mounted in place by spring force exerted between the ceiling 36 and the floor 37 of a garage 38. Such tension rod mounting provides a quick and easy means of locating the indicating device in the garage particularly when it is not possible or feasible to mount the device directly on a concrete wall of the garage, or that other objects are located in front of the back wall of the garage. The indicating device located in front of such objects will prevent the driver from accidentally running over them when driving the automobile into the garage. The tension rod 35 may be separated into two tubular sections, namely, a top tubular section 39 and a lower tubular section 40. The two tubular sections may be mounted to the support frame 11 separately. An adjustable plunger 41 is telescopically mounted to the top end of the top tubular section 39 and a compression spring 42 is provided between the plunger 41 and the top tubular section 39 such that the spring force will maintain the tension rod 40 securely in place. The length of the plunger 41 may be adjusted by varying its length extending outside of the top end of the top tubular section 39 and it can be maintained in the adjusted position by a securing pin 43 inserted crosswise through the top tubular section 39 and the plunger 41.

Obviously, numerous modifications and variations of the present invention are possible in light of the above teachings. It is therefore to be understood that within the scope of the appended claims, the invention may be practised otherwise than as specifically described herein.

What I claim:

1. A clearance indicating device for signalling the safe distance of an automobile from a vertical wall surface, comprising a support frame member disposed juxtaposed to said wall surface, an elongated contact rod member pivotally mounted on said support frame member, said contact rod member having a lower portion operative to contact said automobile and being pivoted thereby, and said contact rod member having an upper end pivotable with respect to said support frame member and relative to various distances said automobile being spaced from said vertical wall surface, a first bracket member mounted on said support frame member, said first bracket member having a horizontal portion and a free end portion extending outwardly and downwardly from said horizontal portion, a first opening formed on said horizontal portion of said first bracket member, a second opening formed on said free end portion of said first bracket member, an L-shaped bracket member mounted on said support frame member, said L-shaped bracket member having a horizontal portion with a third opening formed therein, a sliding rod member mounted on said support frame member and slidably extending through said first opening and said third opening, said sliding rod member having a top end and a bottom end therein, a first flexible cable member slidably extending through said second opening formed in said free end portion of said first bracket member, said first flexible cable member having one end connected to said upper end of said contact rod member and a second end connected to said bottom end of said sliding rod member, a fourth opening formed in said sliding rod member, said fourth opening being located adjacent said top end of said rod member, a second flexible cable member mounted to said sliding rod member, said second flexible cable member having a first end and a second end therein, said flexible cable member being slidably extending through said fourth opening whereby said first end therein is disposed on one side of said sliding rod member and said second end therein is disposed on a second side of said sliding rod member, a first swing arm member pivotally mounted in a cantilever manner on said support frame member and located adjacent to said one side of said sliding rod member, said one end of said second flexible cable means being connected to said first swing arm member, a second swing arm member pivotally mounted in a cantilever manner on said support frame member and located adjacent to said second side of said sliding rod member, said second end of said second flexible cable member being connected to said second swing arm member.

2. A clearance indicating device according to claim 1 including a conspicuous member mounted at said top end of said sliding rod member, and a simulated human hand figure member mounted on each of said first swing arm member and second swing member.

3. A clearance indicating device according to claim 2 including a weight member mounted to said second swing arm member.

4. A clearance indicating device according to claim 3 wherein said support frame member is directly mounted on said vertical wall surface and located at a level clearly visible by the driver of said automobile.

5. A clearance indicating device according to claim 4 wherein said support frame member is mounted on a support rod located juxtaposed to said vertical wall surface.

6. A clearance indicating device according to claim 5 wherein said support frame member is mounted on a vertical tension mounting rod disposed adjacent to said vertical wall surface, said tension mounting rod having an adjustable length.

* * * * *